US009981507B2

(12) United States Patent
Warfford et al.

(10) Patent No.: US 9,981,507 B2
(45) Date of Patent: May 29, 2018

(54) TIRE TREAD HAVING A PLURALITY OF WEAR LAYERS

(71) Applicants: MICHELIN RECHERCHE ET TECHNIQUE S.A., Granges-Paccot (CH); COMPAGNIE GENERALE DES ESTABLISSEMENTS MICHELIN, Clermont-Ferrand (FR)

(72) Inventors: Jeffrey Thomas Warfford, Simpsonville, SC (US); Damon Lee Christenbury, Fountain Inn, SC (US); Robert Cecil Lawson, Clermont-Ferrand (FR); Timothy A. White, Ceyrat (FR)

(73) Assignee: Compagnie Générale des établissements Michelin, Clermont-Ferrand (FR)

( * ) Notice: Subject to any disclaimer, the term of this patent is extended or adjusted under 35 U.S.C. 154(b) by 0 days. days.

(21) Appl. No.: 15/190,383

(22) Filed: Jun. 23, 2016

(65) Prior Publication Data

US 2016/0297248 A1    Oct. 13, 2016

Related U.S. Application Data

(63) Continuation of application No. 13/881,797, filed as application No. PCT/US2011/057546 on Oct. 24, 2011, now Pat. No. 9,387,728.
(Continued)

(51) Int. Cl.
*B60C 11/03* (2006.01)
*B60C 11/00* (2006.01)
(Continued)

(52) U.S. Cl.
CPC ............ *B60C 11/033* (2013.01); *B60C 11/00* (2013.01); *B60C 11/0327* (2013.01);
(Continued)

(58) Field of Classification Search
CPC ............... B60C 11/032; B60C 11/0323; B60C 11/0327; B60C 11/033; B60C 11/1281
See application file for complete search history.

(56) References Cited

U.S. PATENT DOCUMENTS 4,574,856 A * 3/1986 Graas ................... B60C 11/0306
152/209.18
5,031,680 A * 7/1991 Kajikawa ............... B60C 11/11
152/209.18
(Continued)

FOREIGN PATENT DOCUMENTS

JP     62-268707    * 11/1987

*Primary Examiner* — Robert C Dye
(74) *Attorney, Agent, or Firm* — Hahn Loeser & Parks LLP; Bret A. Hrivnak

(57) ABSTRACT

Particular embodiments of the present invention include a multi-stage tire tread having two or more wear layers comprising an outer wear layer and one or more inner wear layers arranged within the thickness of the tread below the outer wear layer and one or more outer grooves are arranged within the outer wear layer. The tread further includes a volumetric void ratio equal to approximately 0.25 to 0.40 in the unworn condition and approximately 0.25 to 0.40 in a worn condition where the outer, ground-engaging side is arranged along one of the inner wear layers in the worn condition, the tread further having a contact surface ratio equal to approximately 0.66-0.72 in the unworn condition and approximately 0.56-0.66 in the worn condition.

20 Claims, 9 Drawing Sheets

Related U.S. Application Data

(60) Provisional application No. 61/408,480, filed on Oct. 29, 2010.

(51) Int. Cl.
*B60C 11/12* (2006.01)
*B60C 11/13* (2006.01)

(52) U.S. Cl.
CPC .......... *B60C 11/0332* (2013.01); *B60C 11/12* (2013.01); *B60C 11/1218* (2013.01); *B60C 11/1281* (2013.01); *B60C 11/0323* (2013.01); *B60C 11/1307* (2013.01); *B60C 11/1353* (2013.01); *B60C 2011/0334* (2013.01); *B60C 2011/0353* (2013.01); *B60C 2011/0365* (2013.01); *B60C 2011/1213* (2013.01)

(56) References Cited

U.S. PATENT DOCUMENTS

| | | | | |
|---|---|---|---|---|
| 7,143,799 B2* | 12/2006 | Collette | ............. | B29D 30/0606 152/209.21 |
| 8,393,365 B2* | 3/2013 | Janesh | ................ | B60C 11/0302 152/209.15 |
| 2005/0183807 A1* | 8/2005 | Hildebrand | ......... | B60C 11/306 152/209.2 |

* cited by examiner

| PERFORMANCE | NEW | WORN |
|---|---|---|
| LOW-MU WET BRAKING | 6% | 3% |
| HIGH-MU DAMP BRAKING | 0% | -4% |
| WET LATERAL ADHERENCE | 3% | 13% |
| WET HANDLING | 2% | 1% |
| LONGITUDINAL HYDROPLANING | 6% | 5% |
| SNOW TRACTION | 24% | 96% |
| ROLLING RESISTANCE | 1% | N/A |
| WEAR | -2% | N/A |

*FIG. 15*

| PERFORMANCE | NEW | WORN |
|---|---|---|
| LOW-MU WET BRAKING | 7% | 2% |
| HIGH-MU DAMP BRAKING | -5% | -5% |
| WET LATERAL ADHERENCE | 1% | 14% |
| WET HANDLING | 2% | 0% |
| LONGITUDINAL HYDROPLANING | 4% | 5% |
| SNOW TRACTION | 29% | 117% |
| ROLLING RESISTANCE | 3% | N/A |
| WEAR | -10% | N/A |

*FIG. 16*

| PERFORMANCE | NEW | WORN |
|---|---|---|
| LOW-MU WET BRAKING | 2% | 0% |
| HIGH-MU DAMP BRAKING | 2% | 0% |
| WET LATERAL ADHERENCE | -1% | 10% |
| WET HANDLING | 1% | 2% |
| LONGITUDINAL HYDROPLANING | -3% | 0% |
| SNOW TRACTION | N/A | N/A |
| ROLLING RESISTANCE | 7% | N/A |
| WEAR | 0% | N/A |

*FIG. 17*

TIRE TREAD HAVING A PLURALITY OF WEAR LAYERS

CROSS-REFERENCE TO RELATED APPLICATIONS

This application is a continuation of, and claims priority to, U.S. patent application Ser. No. 13/881,797, filed Apr. 26, 2016, which is a national stage entry of International Application No. PCT/US2011/057546, filed Oct. 24, 2011 with the U.S. Patent Office, which claims priority to, and the benefit of, U.S. Provisional Patent Application No. 61/408,480, filed Oct. 29, 2010 with the U.S. Patent Office, each of which are hereby incorporated by reference.

BACKGROUND OF THE INVENTION

Field of the Invention

This invention relates generally to tire treads for use on tires, and more specifically to tire treads having a plurality of wear layers.

Description of the Related Art

Tire treads generally extend about the outer circumference of a tire to operate as the intermediary between the tire and a surface upon which it travels (i.e., an operating or ground surface). Contact between the tire tread and the operating surface occurs along a footprint of the tire. Tire treads provide grip to resist tire slip that may result during tire acceleration, braking, and/or cornering in dry and wet conditions. Tire treads may also include tread elements, such as ribs or lugs, and tread features, such as grooves and sipes, each of which may assist in providing target tire performance when a tire is operating under particular conditions.

One common problem faced by tire manufacturers is how to improve worn tire performance without sacrificing new tire performance. For example, while altering tread features and/or increasing the surface or volumetric tread void may improve the worn wet performance; these alternations may increase the surface and/or volumetric void in the new tire beyond that which is desired. The increase in void may also reduce the tread stiffness. While a change in tread compound may provide improved worn tire performance, the tire may experience increased wear rates and/or increased rolling resistance beyond the desired tire performance parameters.

Therefore, there is a need for a tire tread that provides improved worn tire performance, especially in wet or snow conditions, without sacrificing new tire performance.

SUMMARY OF THE INVENTION

Particular embodiments of the present invention include a multi-stage tire tread having a thickness extending inward depthwise from an outer, ground-engaging side of the tread, the outer, ground-engaging side including an outer contact surface. The tread further includes two or more wear layers arranged within the tread thickness at different depths, the two or more wear layers comprising an outer wear layer and one or more inner wear layers arranged within the thickness of the tread below the outer wear layer. The tread further including one or more outer grooves arranged within the outer wear layer, the one or more grooves exposed to the outer, ground-engaging side when the tread is in an unworn condition. In particular embodiments, the tread has a volumetric void ratio equal to approximately 0.25 to 0.40 in the unworn condition and approximately 0.25 to 0.40 in a worn condition where the outer, ground-engaging side is arranged along one of the inner wear layers in the worn condition, the tread further having a contact surface ratio equal to approximately 0.6-0.72 in the unworn condition and approximately 0.56-0.66 in the worn condition.

In another embodiment, the multi-stage tread layer includes an outer, ground-engaging side including an outer contact surface and a thickness extending inward depthwise from the outer, ground-engaging side of the tread, the thickness including a plurality of wear layers, each of the wear layers located a different depth from the outer, ground-engaging side of the tread. The tread further includes one or more intermediate elements arranged longitudinally along a length of the tread, the one or more intermediate elements being bounded laterally by one or more shoulder elements, each of the shoulder elements being located adjacent a lateral side edge of the tread and including a recessed void extending generally in a lateral direction of the tire, the recessed void being arranged within the tread thickness below the outer, ground engaging side. The tread may further include one or more longitudinal grooves arranged between the shoulder elements and extending lengthwise along a length of the tread, the one or more longitudinal grooves having a width that increases as each such groove extends deeper into the tread thickness away from the outer, ground-engaging side.

The foregoing and other objects, features and advantages of the invention will be apparent from the following more detailed descriptions of particular embodiments of the invention, as illustrated in the accompanying drawing wherein like reference numbers represent like parts of the invention.

BRIEF DESCRIPTION OF THE DRAWINGS

FIG. 15 is a table showing the performance results of various test comparing a tire utilizing the multi-stage tread of FIG. 1 against a reference tire.

FIG. 16 is a table showing the performance results of various test comparing a tire utilizing the multi-stage tread of FIG. 7 against a reference tire.

FIG. 17 is a table showing the performance results of various test comparing a tire utilizing the multi-stage tread of FIG. 12 against a reference tire.

DETAILED DESCRIPTION OF PARTICULAR EMBODIMENTS

It is generally known that as a tire wears, the outer, ground-engaging tread side surface wears into the depth or thickness of a tire tread. In wet, snow, or off-road conditions, tire treads are often designed to maintain tire performance and vehicle handling by adding additional void within the tread to better consume or redirect the water, snow, or mud from the location where the tire contacts the ground surface (which is also referred to as the "contact patch" or "footprint"). When increasing void, however, tread rigidity can decrease. This can also cause a reduction in other tire performance measures. Accordingly, particular embodiments of the present invention provide a tire tread having multiple wear stages or layers, where the tread generally maintains void content available to an outer, ground-engaging side of the tread as it wears without substantially sacrificing certain new tire performance measures. In other words, in lieu of certain new tire performance measures decreasing when increasing void in the worn tire tread, new tire performance measures may instead be maintained or even increased to provide a more consistently performing tire over the lifetime of the tire.

Figure 19:
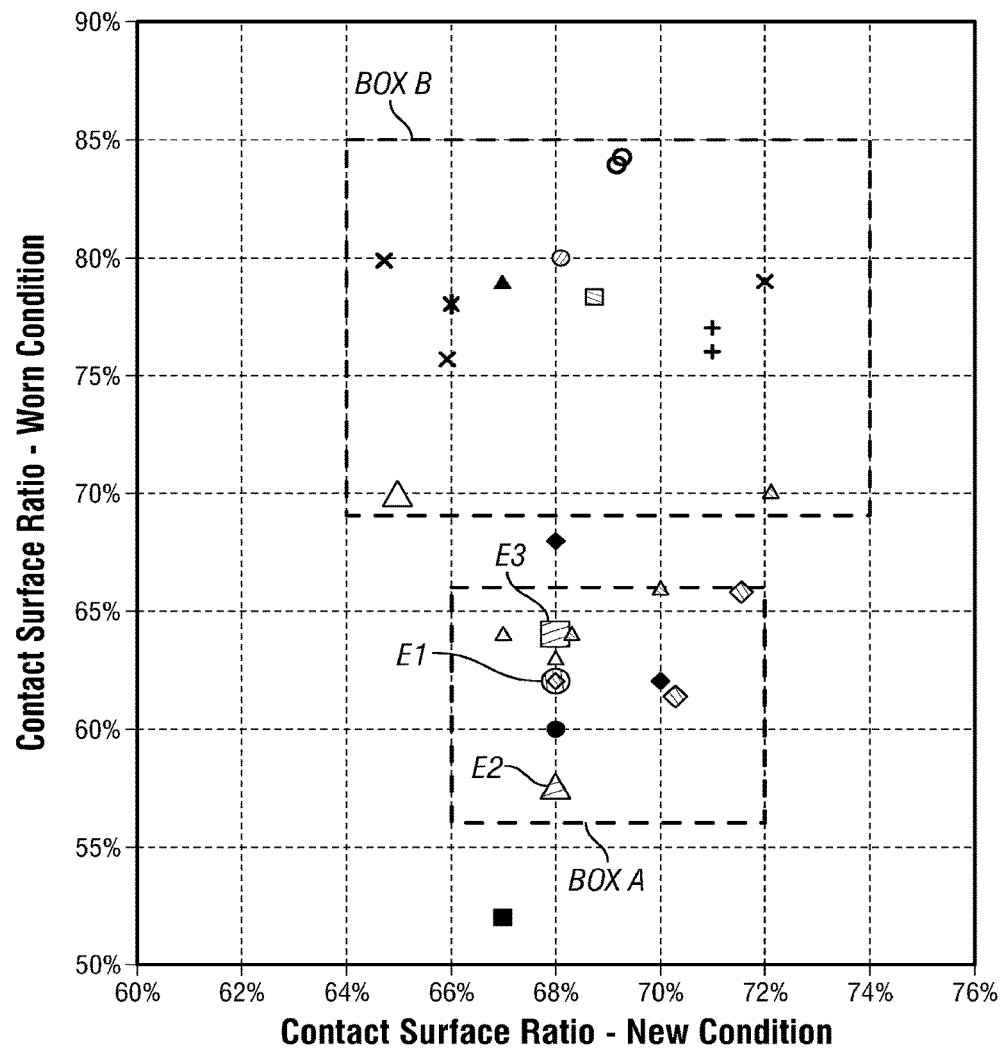
FIG. 19 is a chart showing various tire treads characterized as having a particular contact surface ratio ("CSR") in new and worn conditions, the chart including a first group of tire treads representing particular embodiments of the invention having a CSR equal to 66 to 72 percent in a new condition and 56 to 66 percent in a worn condition and a second group of tire treads having a conventional CSR ratio equal to 20 to 30 percent in a new condition and 10 to 20 percent in a worn condition, where the tread is worn to a thickness of 1.6 mm in the worn condition. The first group is designated as Box A in the chart, while the second group is designated as Box B. Data corresponding to the tread shown in FIGS. 1-5 is designated as a first embodiment E1 in chart, while the data corresponding to the tread of FIGS. 6-9, 11 is designated as a second embodiment E2 in the chart. Data corresponding to the tread shown in FIGS. 12-14 is designated as a third embodiment E3 in the chart. Other data corresponding to other inventive tread designs are also shown in the chart, each of which are understood to perform similarly to the Treads 1-3 as represented in FIGS. 15-17.

Voids arranged within a tread may be quantified or evaluated as surface voids or volumetric voids. Surface void generally refers to the amount of void area present along a tire's outer, ground-engaging side. In fact, the amount of surface void present within a tire's contact patch is often considered and analyzed, the contact patch being the interface between the tire and the operating or ground surface (i.e., the surface upon which the tire operates). In particular, surface void can be quantified or evaluated by use of a contact surface ratio, which represents the area of tread surface for contacting the ground that is present within the perimeter of a contact patch along the outer, ground-engaging side of the tread divided by total area within the perimeter of the contact patch. The area within the contact patch that does not comprise the outer tread surface (i.e., contact surface) is considered surface void. As a tire tread wears to its base in a completely worn state where all tread voids are eliminated, the contact surface ratio would approach a value of one. Generally, a new or unused tread of the present invention having the outer, ground-engaging side arranged along an initial wear layer is characterized as having a contact surface ratio of approximately 0.66 to 0.72 (i.e., 66-72%), while a used or worn tire having the outer, ground-engaging side arranged along a subsequent wear layer is characterized as having a contact surface ratio of approximately 0.56 to 0.66 (i.e., 56-66%) or approximately 0.58 to 0.64 (i.e., 58-64%) in other embodiments. In certain embodiments, the subsequent wear layer is achieved when the tread has been worn to a thickness of 1.6 mm. These contact surface ratios are shown in FIG. 19, where particular ranges concerning various embodiments of the invention are shown in Box A for new and worn conditions while conventional ranges are shown in Box B for both new and worn conditions, where the tread thickness is 1.6 mm in the worn condition. In further embodiments, the contact surface ratio is approximately the same when the outer, ground-engaging side of the tread is arranged atop different wear layers, that is, in other words, the new and worn contact surface ratios for a tread may be approximately equal. The initial wear layer may also be referred to as the first or outer wear layer. Any subsequent wear layer is also referred to as an inner wear layer, and may comprise a second, final, or intermediate wear layer.

Figure 18:
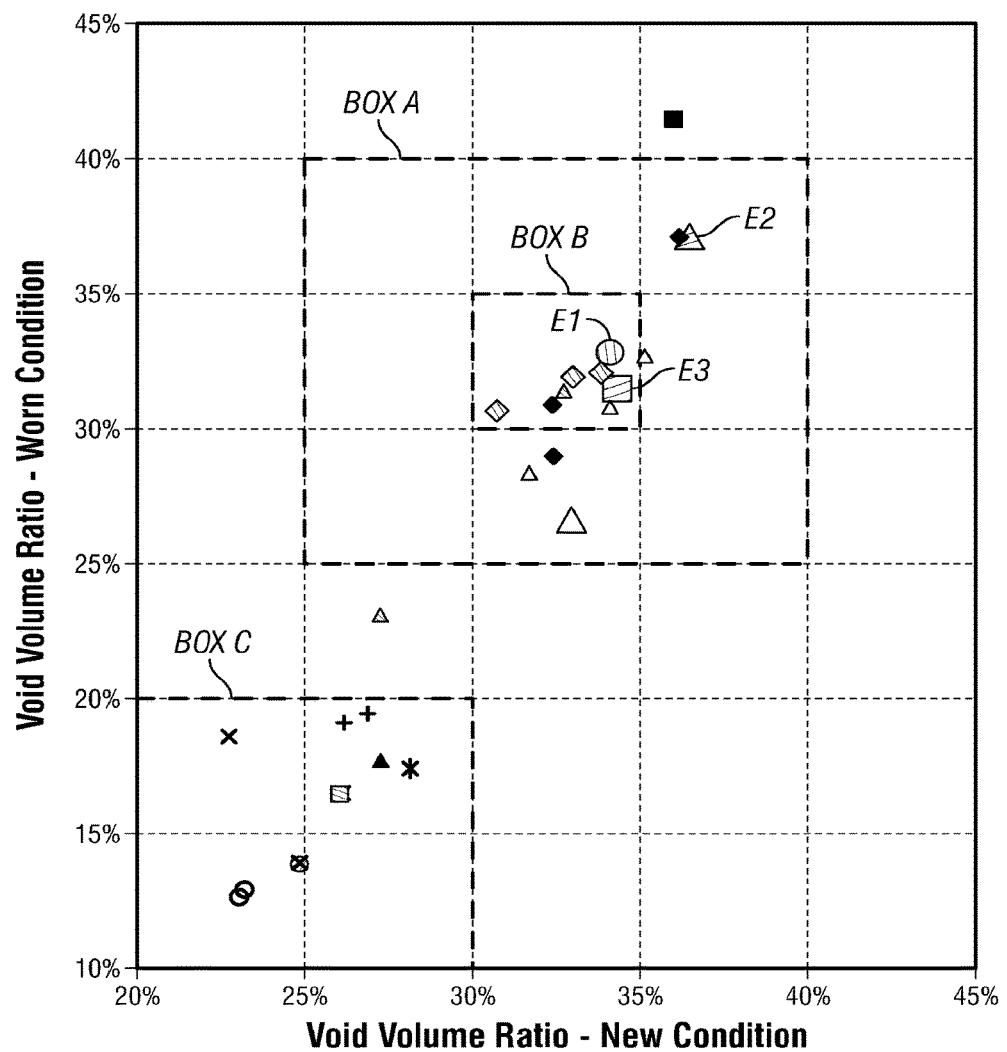
FIG. 18 is a chart showing various tire treads characterized as having a particular volumetric void ratio in new and worn conditions, the chart including: a first group of tire treads representing particular embodiments of the invention having a volumetric void ratio equal to 25 to 40 percent in a new condition and 25 to 40 percent in a worn condition; a second group of tire treads representing particular embodiments of the invention having a void ratio equal to 30 to 35 percent in a new condition and 30 to 35 percent in a worn condition; and, a third group of tire treads having a conventional void ratio equal to 20 to 30 percent in a new condition and 10 to 20 percent in a worn condition, where the tread is worn to a thickness of 1.6 mm in the worn condition. The first group is designated as Box A in the chart, while the second group is designated as Box B and the third group is designated as Box C. Data corresponding to the tread shown in FIGS. 1-5 is designated as a first embodiment E1 in the chart, while the data corresponding to the tread of FIGS. 6-9, 11 is designated as a second embodiment E2 in the chart. Data corresponding to the tread shown in FIGS. 12-14 is designated as a third embodiment E3 in the chart. Other data corresponding to other inventive tread designs are also shown in the chart, each of which are understood to perform similarly to the Treads 1-3 as represented in FIGS. 15-17.

The amount of volumetric void within a tread may also be considered and analyzed, as this void may be useful for consuming and channeling water from the contact patch in wet conditions. Volumetric void (or "void volume") generally comprises the volume of void contained within a defined portion of the tread. Volumetric void ratio is defined as the volume of void contained within a tread divided by the total volume of the tread, the total volume of the tread including both the total volume of tread material and the total volume of void contained within a thickness of the tread extending inward from an outer side of the tread For example, the defined portion may extend: depthwise from the outer, ground-engaging side to a surface or plane arranged at the bottom of the deepest groove or void of the tread; laterally between planes extending vertically along opposing lateral side edges of the tread; and longitudinally along a length of the tread (such as a length sufficient to form a ring about a tire). As the tire tread wears and voids are eliminated, the volumetric void ratio may approach a value of zero in a completely worn state (i.e., zero void divided by the total tread volume). Generally, a new or unused tread of the present invention having the outer, ground-engaging side arranged along an initial wear layer is characterized as having a volumetric void ratio of approximately 0.25 to 0.40 (i.e., 25-40%), while a used or worn tire having the outer, ground-engaging side arranged along a subsequent wear layer is characterized as having a volumetric void ratio of approximately 0.25 to 0.40 (i.e., 25-40%). In another embodiment, a tread is characterized as having a volumetric void ratio of approximately 0.30 to 0.35 (i.e., 30-35%) in both a used and unused state. In particular embodiments, the subsequent wear layer of the worn state is achieved when the tread has been worn to a thickness of 1.6 mm. These void volume ratios are shown in FIG. 18, where the broader range is defined by Box A and the narrower range by Box B, each being shown in association with conventional ranges identified by Box C whereby each such conventional range has a new void ratio between 0.20 and 0.30 (i.e., 20 and 30%) in a new condition and between 0.10 and 0.20 (i.e., 10 and 20%) in a worn condition. The tread is worn to a thickness of 1.6 mm in the worn condition.

As suggested above, an increase in tread void can reduce the local and overall rigidity of the tread. For example, longitudinal rigidity can affect tire performance, such as acceleration and braking where a change in velocity causes elastic longitudinal deformations in the tire tread. By further example, a lateral rigidity can affect cornering performance when a vehicle navigates a turn. Accordingly, when increasing tread voids, means for maintaining or increasing tread rigidity may be employed. This may not only be accomplished for the overall tire, but within each wear stage of the tread. Therefore, longitudinal and/or lateral rigidity may be maintained or increased for a tread in an unused state while also adding additional void within a tread to increase the void in the worn tread.

Longitudinal rigidity may be quantified or evaluated by use of a longitudinal rigidity factor. The longitudinal rigidity factor is determined by vertical loading a tire and measuring the longitudinal force ($F_x$) required to displace a portion of the tread one unit measured (such as 1 millimeter, for example). The longitudinal rigidity factor is then calculated by dividing the longitudinal force ($F_x$) by the radial force (i.e., vertical force) ($F_z$), or $F_x/F_z$. This can be performed physically or by way of computer modeling, such as by using finite element analysis. For example, in a particular finite element analysis used to obtain the longitudinal rigidity factors below, a tread model having a particular thickness is applied to a ground surface, whereby the tread is constrained along its back side (i.e., the side attached to a tire carcass) in the longitudinal (x) and lateral (y) directions. A 3 bar pressure load (Fz) is then applied to the back side such that load operates as a compressive load forcing an outer side of the tread against the ground surface. A 1 millimeter displacement between the ground surface and the tire is provided in the longitudinal direction, and the reaction force (Fx) of the tread measured in the longitudinal direction. The longitudinal rigidity factor is then obtained as described above. Generally, a new or unused tread of the present invention having the outer, ground-engaging side arranged along an initial wear layer is characterized as having a longitudinal rigidity factor of approximately 0.39-0.55 (i.e., 39-55%), while a used or worn tire having the outer, ground-engaging side arranged along a subsequent wear layer is characterized as having a longitudinal rigidity factor of approximately 1.43-1.75 (i.e., 143-175%). In particular embodiments, the subsequent wear layer of the worn state is achieved when the tread has been worn to a thickness of 1.6 mm.

By managing void content and sculpture rigidity, the improved balancing of new (i.e., unused) and worn tread performance may be achieved in snow and wet conditions over the useful life of the tire. In other words, the inventive management of void content and sculpture rigidity achieves increased worn tire performance in wet and snow conditions without sacrificing new tire performance. Exemplary tire treads, having contact surface ratios, volumetric void ratios, and longitudinal rigidity ratios described above, are discussed further below with reference to the accompanying figures.

In various embodiments of the present invention, particular tread features are submerged (i.e., hidden, located or contained) within the tread depth to provide a tire tread having at least two wear layers. The initial wear layer comprises the outer tread surface of a new tire, while the tread features associated with one or more submerged wear layers become exposed after a desired amount of tread is worn from the tire. To provide improved wet or snow performance in a worn tire, a hidden tread layer may include one or more tread features, such as additional sipes and/or additional lateral grooves in the shoulder. Other features that can affect all wear layers include longitudinal grooves having a negative draft angle (i.e., a groove having a width that increases as the groove extends deeper into a thickness of the tread from an outer, ground-engaging side). To recover, maintain, or even increase tread rigidity, undulating or interlocking sipes may be employed in the shoulder area and/or along more intermediate ribs or tread elements of the tire. Various embodiments of treads employing these and other concepts will now be discussed in particularity.

Figure 1:
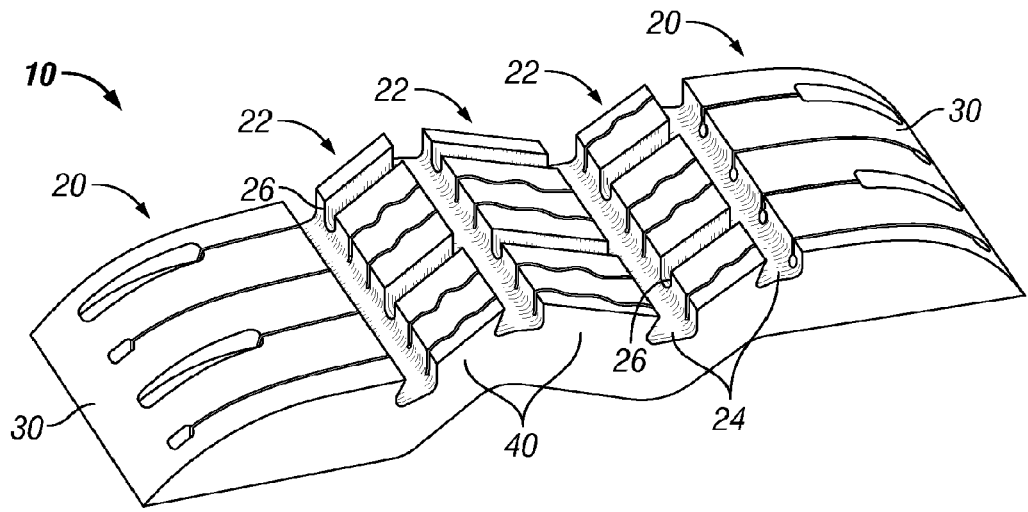
FIG. 1 is a top perspective view of a multi-stage tire tread, according to an embodiment of the invention.
Figure 2:
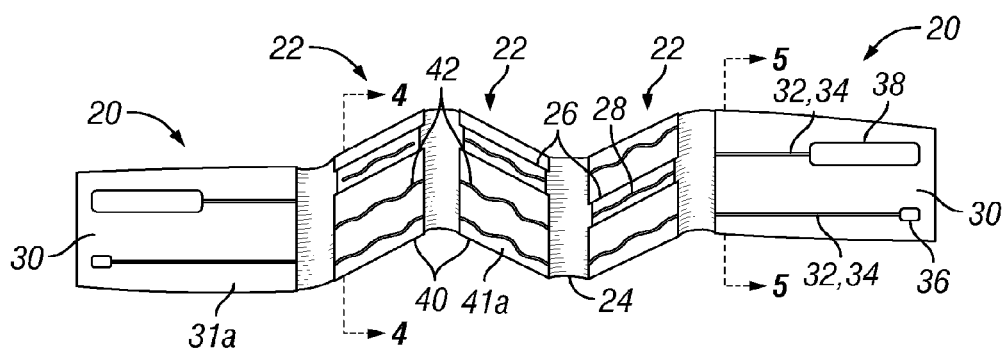
FIG. 2 is a top view of the multi-stage tire tread of FIG. 1, in accordance with an embodiment of the invention.

With reference to FIGS. 1-2, a first particular embodiment of a tire tread is shown having multiple tread wear layers and features to improve wet and/or snow performance in new and worn tires. Tread 10 shown is a five (5) rib tread including three (3) intermediate ribs 22 bounded laterally by a pair of shoulder ribs 20 extending longitudinally along tread 10 (or circumferentially about a tire) with longitudinal grooves 24 arranged there between. Each shoulder rib 20 contains a plurality of shoulder tread elements 30 arranged in a longitudinal (or circumferential) array along tread 10. Each intermediate rib 22 contains a plurality of intermediate tread elements 40 also arranged in a longitudinal (or circumferential) array along tread 10. Laterally bounding each of the intermediate ribs 22 is a longitudinal groove 24. Each of the elements 30 and 40 have a top outer tread surface (i.e., an outer, ground-engaging contact surface), each of which may exist in a new tread stage 31a, 41a or in a worn tread stage 31b, 41b. The outer tread surface is arranged along an outer, ground-engaging side of the tread. It is understood that shoulder and/or intermediate tread elements 30, 40 may be arranged in a longitudinal or circumferential array to form a corresponding shoulder or intermediate rib 20, 22 (as generally shown), or may be arranged such that the shoulder and/or intermediate tread elements 30, 40 are not arranged longitudinally or circumferentially in an array.

With continued reference to FIGS. 1-2, each shoulder includes a pair of tear drop sipes 32. Each teardrop sipe 32 extends from an interior circumferential groove 24 and laterally outward toward a side of the tread at a constant depth. One of the two teardrop sipes 32 extends laterally a full length across the shoulder element 30 while the other teardrop extends laterally a partial length across the shoulder element before terminating at a lateral evacuation groove 38. Each element 40 in any intermediate rib 22 is bounded longitudinally by a partial depth groove 26. At the bottom of each partial depth groove 26 is a laterally and radially undulating sipe 28 extending downwardly into the tread depth. In this application, undulating means extending in an alternating non-planar path, where a non-linear path may comprise a curvilinear or zig-zag path, for example. Further, laterally undulating means undulating in a path extending generally in a lateral direction of the tread or across the tread width $T_W$, and radially undulating means undulating in a path through a thickness $T_T$ of the tread. Each element 40 includes a pair of sipes 42. Sipes 42 extend across a width of each element 40 in an undulating path, the path generally extending at an angle α relative to a line orthogonal or normal to longitudinal groove 24. In the embodiment shown, angle α is approximately equal to thirty degrees)(30°), although it is contemplated that other angles may be employed in other embodiments. The pair of sipes 42 is generally spaced evenly along each element 40 in a longitudinal direction of tread 10. The thickness of all sipes in tread 10 are approximately 0.4 approximately millimeters (mm) thick, but may range between 0.2 and 0.5 mm in thickness in other variations.

Figure 3:
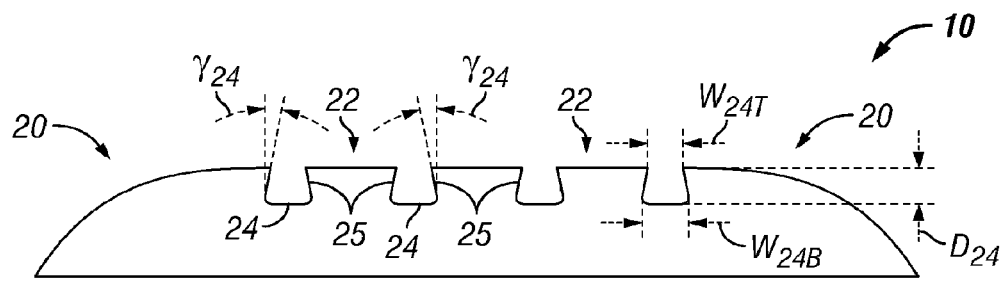
FIG. 3 is an end view of the multi-stage tire tread of FIG. 1, according to an embodiment of the invention.

With reference to FIG. 3, longitudinal grooves 24 are each formed with side walls 25 having a negative draft angle γ. A side wall 25 having a "negative draft angle" means that the width of the groove increases with increasing tread depth (i.e., as the groove extends deeper into a thickness of the tread relative the outer, ground-engaging side). As can be seen in the figure, the top groove width $W_{24T}$ of longitudinal groove 24 along the new tread surface is narrower than the bottom groove width $W_{24B}$. In the embodiment shown, the negative draft angle γ is approximately equal to eleven degrees (11°) but may be approximately ten to twelve degrees (10°-12°) in the present embodiment. Top groove width $W_{24T}$ is approximately equal to 8.45 millimeters (8.45 mm), but may be 8 to 14 millimeters (8-14 mm) in the present embodiment. Each groove 24 extends into the tread by a depth $D_{24}$, which is also approximately the total tread depth $D_T$ in the present embodiment. The present longitudinal groove depth $D_{24}$ is approximately nine millimeters (9 mm), but may be 6 to 10 millimeters (6-10 mm) in the present embodiment. Still, other variations may employ other negative draft angles γ, groove widths $W_{24T}$, $W_{24B}$, and groove depths $D_{24}$ not otherwise specified. As used herein, "approximately the total tread depth" means the total tread depth $D_T$ with a deviation of approximately 0.5 mm.

Figure 4:
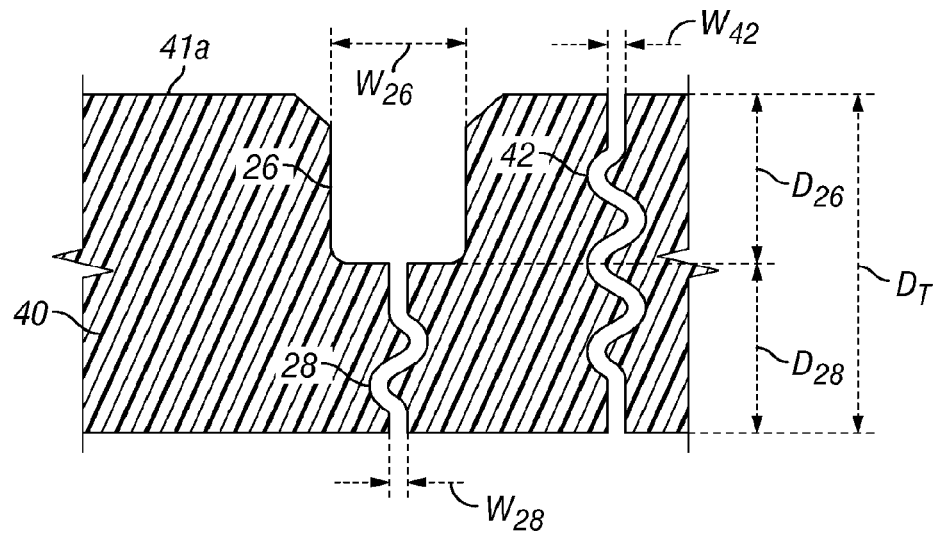
FIG. 4 is a sectional view taken along line 4-4 of the multi-stage tire tread of FIG. 2, according to an embodiment of the invention.

With reference to FIG. 4, a partial side view of an element 40 is shown taken along section 4-4 in FIG. 2. As can be seen, partial depth lateral groove 26 extends a distance $D_{26}$ downward from the tread surface into the depth of the tire tread. Extending further into the tread depth from the bottom of lateral groove 26 is a laterally and radially undulating sipe 28. Also shown in the figure is a laterally undulating sipe 42 arranged within element 40. Sipe 42 extends the approximate full tread depth in this embodiment, but may extend less than the approximate full tread depth in other embodiments. Lateral groove 26 generally has a width $W_{26}$ of approximately 4.5 mm, but may generally range between 3 mm and 6 mm in particular embodiments. Sipes are generally characterized as have a width that is significantly narrower the width of a groove. In particular embodiments, sipes 28, 42 have a corresponding width $W_{28}$, $W_{42}$ of approximately 0.4 mm, but may range between 0.2 mm and 0.6 mm.

Figure 5:
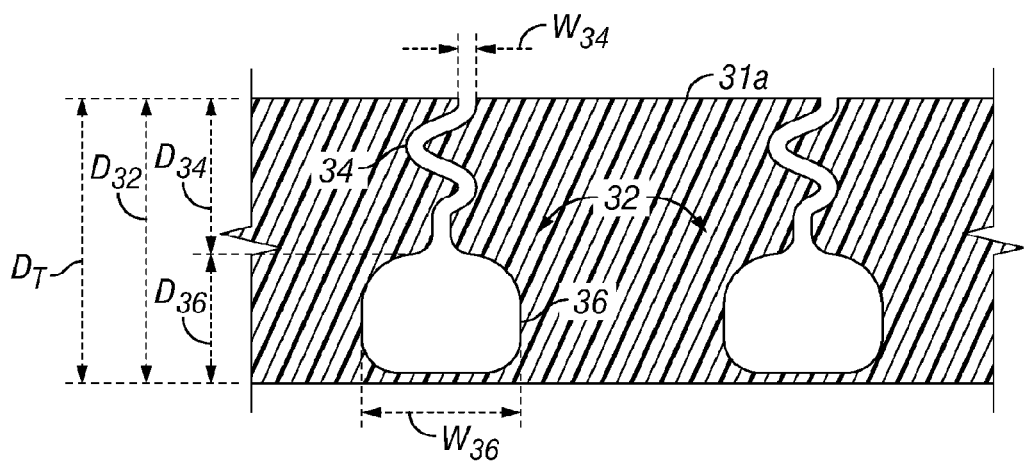
FIG. 5 is a sectional view taken along line 5-5 of the multi-stage tire tread of FIG. 2, according to an embodiment of the invention.

With reference to FIG. 5, an exemplary lateral teardrop sipe 32 is shown along shoulder element 30 in a partial view taken along section 5-5 in FIG. 2. Lateral teardrop sipe 32 generally includes a sipe portion 34 and a lower groove (i.e., teardrop) portion 36. Sipe portion 34 extends in an undulating manner a desired depth $D_{34}$ between the outer tread surface and the lower groove portion 36. Further, sipe portion 34 has a width or thickness $W_{34}$ approximately equal to 0.4 mm, but which may vary as desired. In a specific embodiment, lower groove portion 36 extends further into the tread depth $D_T$ by a desired depth $D_{36}$ of approximately 2.8 millimeters, while in more general embodiments, depth $D_{36}$ extends 2 to 4 mm. Lower groove portion 36 further includes a width $W_{36}$ of approximately 3.5 mm, but may vary generally between 3 and 5 mm. In the embodiment shown in FIG. 2, teardrop sipe 32 extends laterally in a linear or non-undulating path. In other embodiments, teardrop sipe 32 extends laterally in a curvilinear or undulating path. It is also shown in FIG. 5 that sipe portion 34 extends radially in a curvilinear or undulating path.

Figure 6:
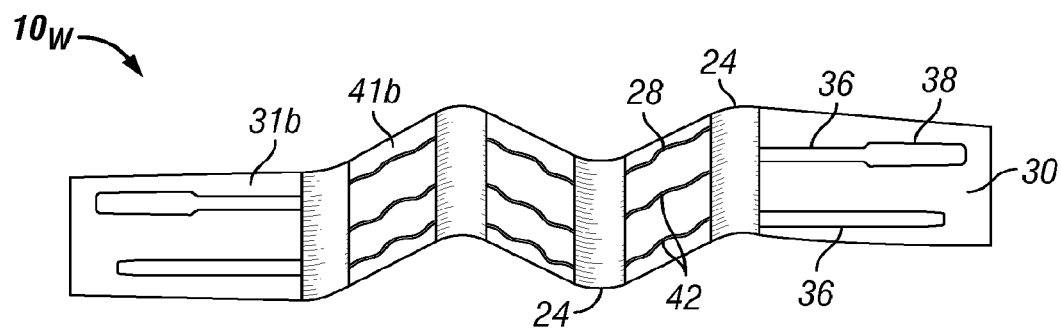
FIG. 6 is a top view of the multi-stage tire tread of FIG. 1 shown in a worn stage, in accordance with an embodiment of the invention.

With reference to FIG. 6, the new tread 10 of FIGS. 1-2 is now shown in a worn state to better identify hidden tread features previously submerged below the new tread surface. Specifically, the worn tread $10_W$ has been worn from an original tread depth $D_T$ of approximately 9 mm to a worn depth of approximately 1.6 mm. Now exposed in shoulder 30 is teardrop lower groove portion 36, which adds surface void and edges to the tread contact surface (i.e., footprint) for improved wet and snow traction. Because the shoulder assists in evacuating water laterally from the tread, adding surface void to the shoulder in the worn state is believed to improve overall water evacuation and wet performance. Because an additional edge is exposed with the lower groove portion 36, snow traction is also improved.

With continued reference to FIG. 6, it is evident that longitudinal groove 24 has widened due to the negative draft side walls to provide an increase in surface void, which is helpful for channeling water and capturing snow. This is beneficial since the groove 24 otherwise loses void volume as the tread wears because a longitudinal groove having non-negative (i.e., positive) draft side walls becomes narrower (i.e., it loses width). Therefore, by increasing the groove width $W_{24B}$ as the tread wears, the groove is able to recapture at least a portion of the volumetric and surface void lost due to continued tread wear. Upon review of intermediate elements 40, an additional edge comprising sipe 28 is now present along the worn surface, in addition to previously present sipes 42. The addition of sipe 28 provides more traction edges along intermediate ribs 22 for an overall increase in traction. The elements 40 also become stiffer due to the loss of partial depth groove 26. A new or unworn tread of the first embodiment having a 9 mm tread depth is characterized as having a contact surface ratio of approximately 0.68, a void volume ratio of approximately 0.34, and a longitudinal rigidity factor of approximately 0.40. When the tread is worn to provide a tread depth of 1.6 mm, the contact surface ratio is approximately 0.62, the void volume ratio is approximately 0.33, and the longitudinal rigidity factor is approximately 1.49. The new and worn void volume ratios and contact surface ratios are shown in FIGS. 18 and 19, respectively, in accordance with a first embodiment E1.

Figure 7:
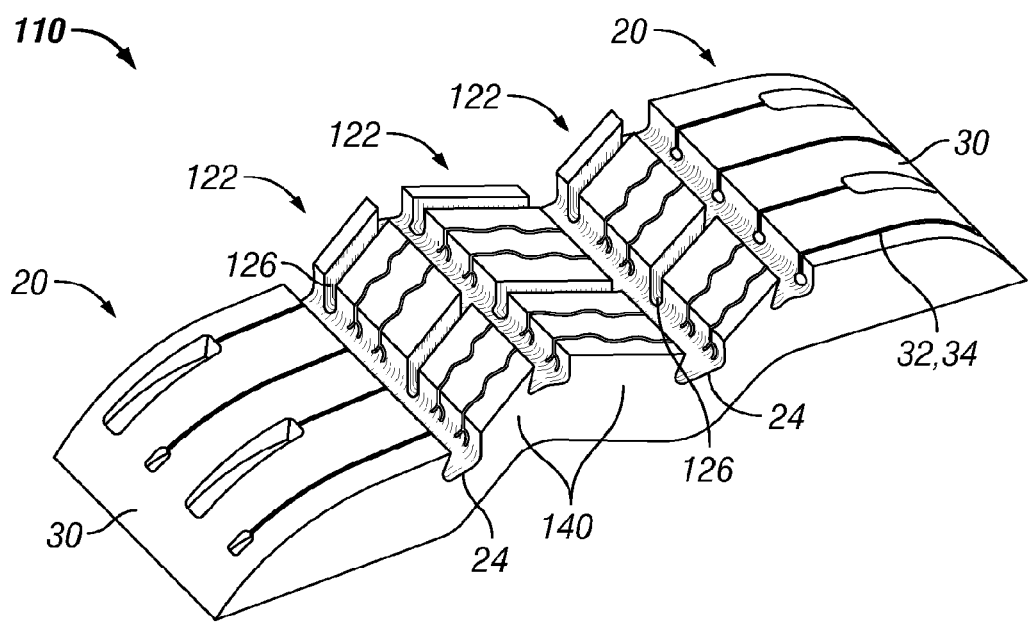
FIG. 7 is a top perspective view of a second embodiment of a multi-stage tire tread, according to an embodiment of the invention.
Figure 8:
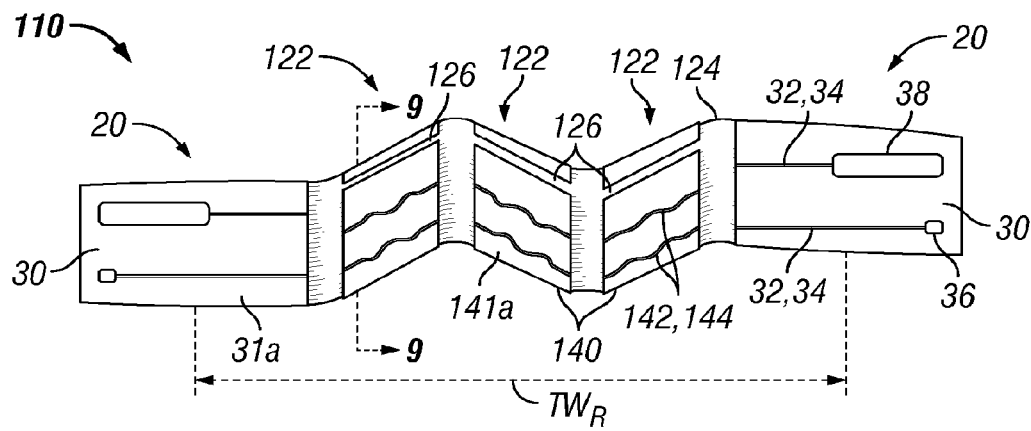
FIG. 8 is a top view of the multi-stage tire tread of FIG. 7, in accordance with an embodiment of the invention.

In a second embodiment shown in FIGS. 7-8, the tread of the previous embodiment in FIGS. 1-2 has been slightly altered by substituting particular features along intermediate ribs 22. Specifically, the prior embodiment has been altered by substituting a full depth lateral groove 126 for the partial depth groove 26 and the continuing sipe 28. Further, full depth undulating sipes 42 within each element 40 have been substituted with undulating inverted Y-shaped sipes 142. The other features of tread 110 remain identical to those of tread 10.

Figure 9:
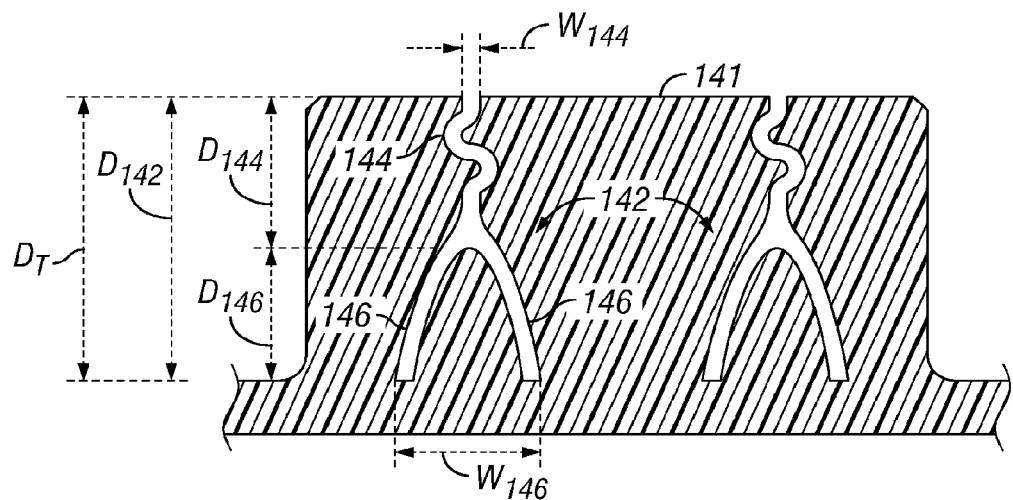
FIG. 9 is a sectional view taken along line 9-9 of the multi-stage tire tread of FIG. 8, according to an embodiment of the invention.

With specific attention to FIG. 9, details of the inverted Y-shaped sipes 142 are provided as taken along line 9-9 in FIG. 8. In this particular embodiment, inverted Y-shaped sipes 142 include an upper sipe portion 144 and a lower portion comprising a pair of legs 146 extending outwardly from the bottom of upper sipe portion 144 as each extend deeper into the tread to a spacing of $W_{146}$. As shown, spacing $W_{146}$ is approximately 3.4 mm, but may be approximately 3 to 5 mm in the present embodiment. Also in this embodiment, upper sipe portion 144 undulates along a path extending from the new tread contact surface 141 to the pair of legs 146 at a depth of $D_{144}$. Upper sipe portions 144 also undulate while extending laterally across the width of each element 140. In the present embodiment, inverted Y-shaped sipes extend to a total depth $D_{142}$, which is approximately the total tread depth $D_T$, with the legs extending a depth $D_{146}$ of approximately 3.5 mm or to 3 to 5 mm. Finally, the present thickness $W_{144}$ of each the upper sipe portion 144 and each leg 146 is approximately 0.4 mm, even though other thicknesses may be employed, including providing different thicknesses for each of the upper sipe portion 144 and each leg 146 and thicknesses that may vary along the length of any upper sipe portion 144 or each leg 146.

Figure 10:
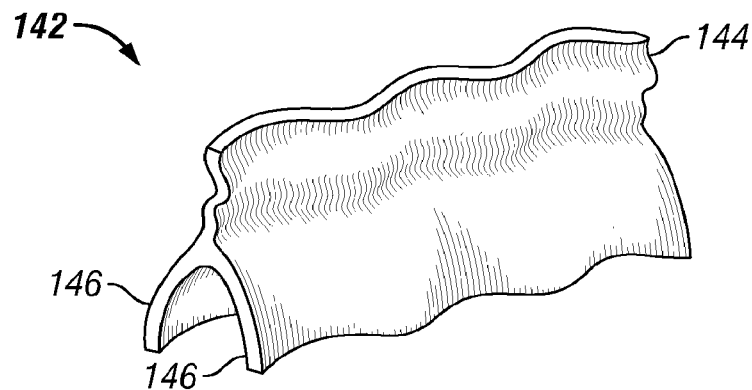
FIG. 10 is a perspective view of an inverted Y-shaped sipe blade used to form an inverted Y-shaped void comprising a negative image of the blade within the tread as shown in the multi-stage tread of FIG. 7, in accordance with an embodiment of the invention.

With reference to FIG. 10, further details of the void formed by an inverted Y-shaped sipe 142 are provided. Specifically, the upper side portions 144 and the pair of legs 146 are shown to undulate both laterally while extending across the width of each element 140 and also undulate extending from the new tread contact surface 141 to the pair of legs 146 to the depth of $D_{144}$ as illustrated in FIG. 9.

Figure 11:
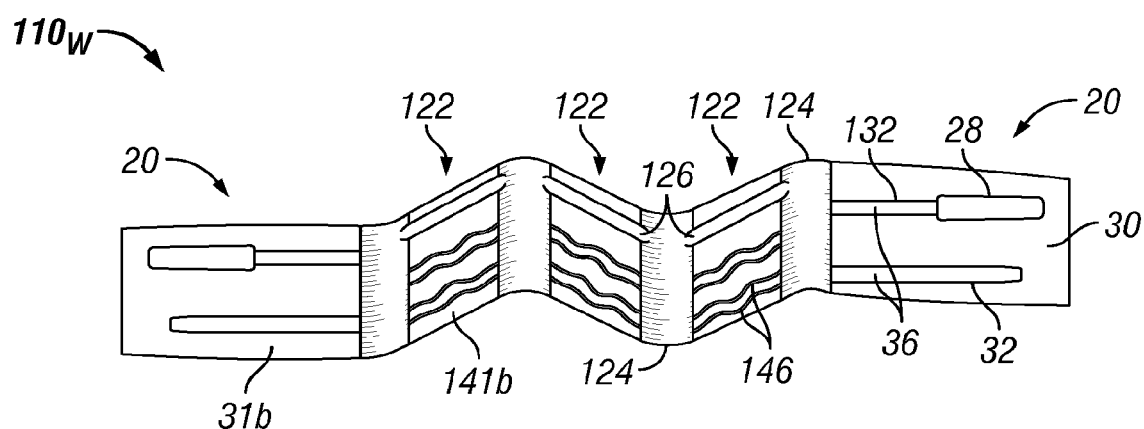
FIG. 11 is a top view of the multi-stage tire tread of FIG. 7 shown in a worn stage, in accordance with an embodiment of the invention.

With reference to FIG. 11, the new tread 110 of FIGS. 8-9 is now shown in a worn state to better identify hidden tread features previously submerged below the new tread surface. Specifically, the worn tread $110_W$ has been worn from an original tread depth $D_T$ of approximately 9 mm to a worn depth of approximately 1.6 mm. Because the only differences between the tread of FIGS. 1-2 and the tread of FIGS. 8-9 are the substitution of a full depth lateral groove 126 for the partial depth groove 26 with continuing sipe 28 and the substitution of undulating inverted Y-shaped sipes 142 for the full depth undulating sipes 42, the following discussion will focus on the changes to the intermediate ribs 122 and elements 140.

With continued reference to FIG. 11, as a supplement to the discussion of FIG. 6, the worn intermediate ribs 122 now expose additional traction edges when the inverted Y-sipe transitions from a single sipe 144 to expose both legs 146. Therefore, tractions edges double when transitioning from the new tread 110 to the sufficiently worn tread $110_W$, which is also an increase in traction edges when comparing the different embodiments $10_W$ and $110_W$. Also, upon considering the addition of a full depth lateral groove, the void change between new and worn states does not vary the void significantly. Therefore, there is little difference between the new and worn state in this regard, although when comparing the worn tread $10_W$, $110_W$ of each embodiment, more void is present in the latter tread $110_W$ due to the presence of the lateral groove 126, which provides more void than the sipe of the former tread $10_W$. Further, the full depth lateral groove creates additional traction edges, such as for improved snow traction. A new or unworn tread of the second embodiment having a 9 mm tread depth is characterized as having a contact surface ratio of approximately 0.68, a void volume ratio of approximately 0.36, and a longitudinal rigidity factor of approximately 0.39. When the tread is worn to depth of 1.6 mm, the contact surface ratio is approximately 0.58, the void volume ratio is approximately 0.37, and the longitudinal rigidity factor is approximately 1.46. The new and worn void volume ratios and contact surface ratios are shown in FIGS. 18 and 19, respectively, in accordance with a second embodiment E2.

Figure 12:
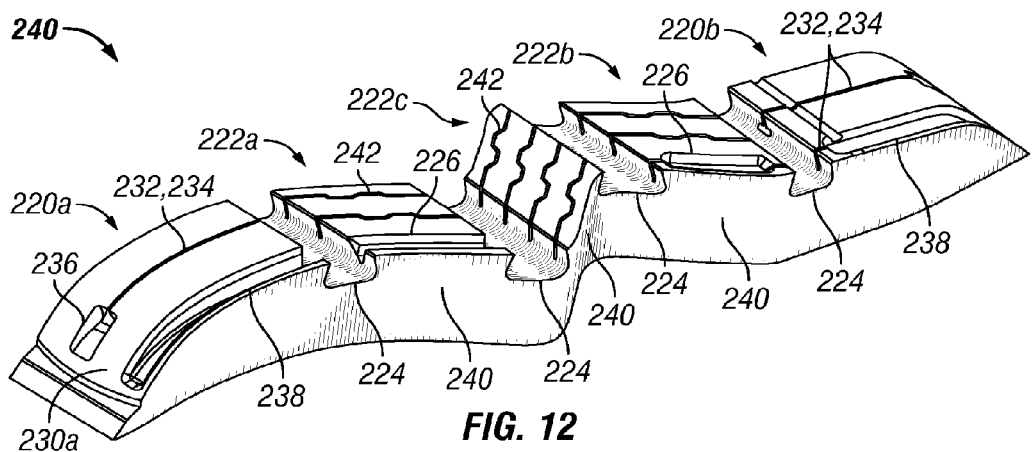
FIG. 12 is a top perspective view of a multi-stage tire tread, according to another embodiment of the invention.
Figure 13:
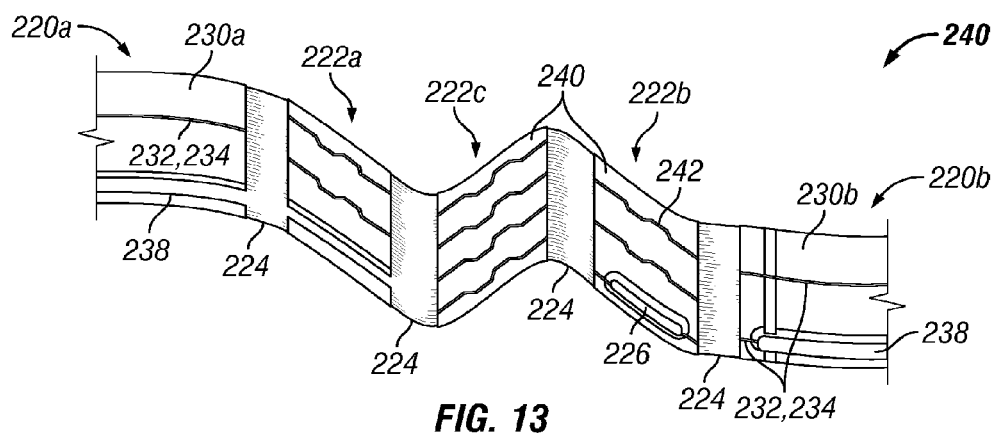
FIG. 13 is a top view of the multi-stage tire tread of FIG. 12 shown in an unworn stage, in accordance with an embodiment of the invention.

With reference now to FIGS. 12-13, a third embodiment of a tread 210 is shown in an unworn or new state. This tread 210 is similar to the tread 10 shown in FIGS. 1-2 with only a few notable differences. The similarities of tread 210 include a 5-rib design comprising a pair of shoulders 220 and a three intermediate ribs 222, each of which are separated by negative draft longitudinal grooves 224, which correspond to the negative draft longitudinal grooves 24 discussed above with reference to tread 10 and shown in FIGS. 1-3. In particular, the pair of shoulders 220 include a first shoulder 220a and a second shoulder 220b. The first shoulder 220a may comprise an inside shoulder while the second shoulder 220b comprises an outside shoulder when mounted on a vehicle. Each shoulder includes a teardrop sipe 232 that is commensurate with teardrop sipe 32 of tread 10 as shown in FIG. 5, and therefore has a sipe portion 234 and a lower groove portion 236 corresponding to portions 34 and 36, respectively, of tread 10. First shoulder 220a also includes a lateral groove 238a extending laterally outward from a longitudinal groove 224. This is unlike the lateral groove 38 of tread 110 shown in FIGS. 1-2, which instead extend from a sipe 32, 34 interposed between the lateral groove 38 and a longitudinal groove 24 along each shoulder 20. The opposing, second shoulder 220b also includes a lateral groove 238b, which is longer than groove 38 of tread 10 but longer than groove 238a. A teardrop sipe 232 is also arranged between groove 238b and a longitudinal groove 224 in similar fashion to the shoulder 20 of tread 10. The variations in the shoulders between treads 10, 110, and 220 are performed to adjust the void and stiffness within each tread as desired to accomplish the desired improvements in tread stiffness in the unworn tread while increasing void in the worn tread.

With regard to the intermediate ribs 222a, 222b, 222c, rib 222a generally includes the same features of a corresponding rib 22 in tread 10. In other words, the sipes 42 and lateral grooves 26 of rib 22 in tread 10 are employed in rib 222a of tread 210 and represented as sipes 242 and lateral grooves 226. The same is true for intermediate rib 222b arranged adjacent second shoulder 222b, with the exception that the lateral groove does not extend fully between adjacent longitudinal grooves 224. Instead, sipes 242 are arranged between each lateral groove 226 and each longitudinal groove 224. Sipes 242 are the same as sipes 42 discussed above with reference to tread 10. With regard to central groove 226, additional sipes 242 are provided in lieu of the lateral groove 26 provided in tread 10. Accordingly, center rib 222c does not have any lateral grooves extending laterally across the rib.

Figure 14:
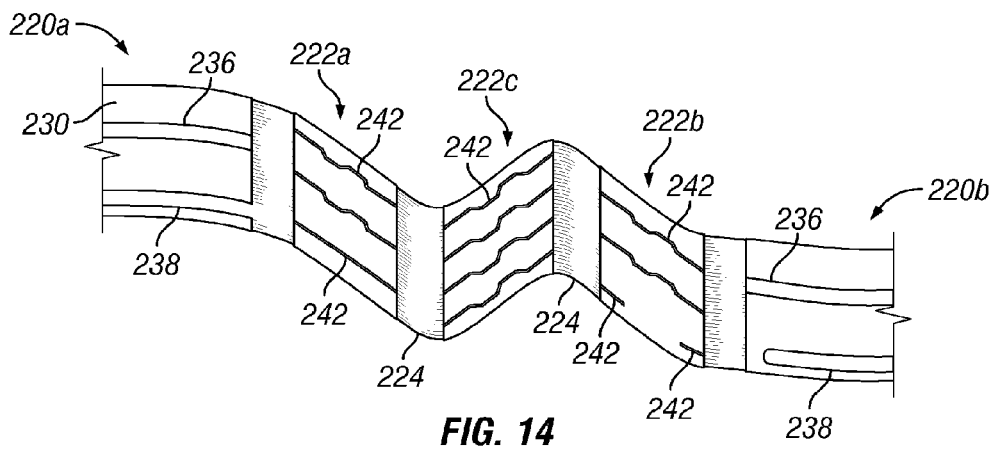
FIG. 14 is a top view of the multi-stage tire tread of FIG. 12 shown in a worn stage, in accordance with an embodiment of the invention.

For testing purposes, the tread design of the third embodiment was manufactured with a tread depth of 7 mm, which is in lieu of the 9 mm tread depth employed by the treads manufactured to represent the first and second embodiments. This reduction in tread depth is part of the tread rigidity management strategy, which operates to increase the tread rigidity after having increased the tread void in the worn tread layers. In any event, any of the tread designs discussed herein may be manufactured with any desired tread depth in accordance with this strategy to increase tread rigidity. A new or unworn tread of the third embodiment having a 7 mm tread depth is characterized as having a contact surface ratio of approximately 0.68, a void volume ratio of approximately 0.34, and a longitudinal rigidity factor of approximately 0.52. With reference to FIG. 14, the tread 220 of FIGS. 8-9 is now shown in a worn state to better identify hidden tread features previously submerged below the new tread surface. Specifically, the worn tread has been worn from an original tread depth of approximately 7 mm to a worn depth of approximately 1.6 mm. In this worn state, the third tread embodiment is characterized as having a contact surface ratio of approximately 0.64, a void volume ratio of approximately 0.31, and a longitudinal rigidity factor of approximately 1.59. The new and worn void volume ratios and contact surface ratios are shown in FIGS. 18 and 19, respectively, in accordance with a third embodiment E3.

Tear drop sipes generally form a recessed void, the recessed void comprising the groove portion of the tear drop sipe. It is understood that other recessed voids may be employed within a subsequent wear layer in any shoulder or intermediate tread element or rib. For example, hidden grooves without any sipe arranged above said groove may be employed, where any such groove becomes exposed with sufficient tread wear. One or more sipes may instead be arranged adjacently or otherwise along the tread, such as along the outer tread surface in any new or worn state. Sipes, grooves, tear drop sipes, or any other recessed voids may be formed by any means for forming voids within treads known to one of ordinary skill in the art. This includes any means for forming recessed voids, such as recessed grooves or sipes or tear drop sipes, For example, molding blades arranged within a mold to penetrate the outer side of the tread may be used. By further example, a form may be arranged or inserted and withdrawn from a side edge of the tread to form recessed voids along the lateral sides of the tread. Further, another example utilizes removable forms arranged within a thickness of the tread, which may be removed or discharged when the form becomes exposed with sufficient tire wear. It is understood that any sipe, groove, or tear drop sipe employed by the treads discussed herein may have a width that remains constant or varies as each extends longitudinally along the tread, and any means for forming each such void may have a corresponding width that also remains constant or varies as desired.

To evaluate the embodiments of FIGS. 1-2 (the "first embodiment"), FIGS. 7-8 (the "second embodiment"), and FIGS. 12-13 (the "third embodiment"), numerous tests were run to evaluate each tread's effect on various tire performance measures. Tires employing each of the treads of the first, second, and third embodiments were each run through various controlled tests to compare the effects of each tire tread against a base reference tire. In preparation for testing, all tires manufactured utilized the same mold profile (with the exception of third embodiment), the same carcass architecture (i.e., carcass construction), and the same tread compound as the reference tire. Further, all treads, including the reference tread and the treads of the first and second embodiments above, were manufactured with a tread depth of 9 mm, while the tread of the third embodiment were manufactured with a tread depth of 7 mm. Another constant between the treads of the first, second, and third embodiments and the reference tread was that each tread design comprised five (5) total ribs (which includes shoulder and intermediate ribs), similarly shaped and sized tread elements, and longitudinal grooves similarly positioned across the tread width. To test the effects of the features in the first and second embodiments, the reference tire tread did not have any negative draft longitudinal grooves, any inverted Y-shaped sipes or any undulating sipes arranged along the intermediate tread elements, or any teardrop sipes arranged along each shoulder.

The following tests were performed to compare the performance of each tread of the first and second embodiment with the reference tread. All tests, with the exception of wear and rolling resistance, were performed using new treads (i.e., having full tread depth) and worn treads buffed to a 1.6 mm tread depth on a 205/55 R16 sized tire.

Low-Mu Wet Braking. This test was performed by comparing the distance required to stop the same vehicle traveling at 50 mph on an asphalt ground surface having a controlled water depth of approximately 1.2 mm.

High-Mu Damp Braking. This test was performed by comparing the distance required to stop the same vehicle traveling at 40 mph on an asphalt surface being watered by a tanker truck having spray nozzles, where the water depth did not exceed the track surface roughness.

Wet Lateral Adherence. This test was performed by comparing the lap time required for the same vehicle to travel completely around a wet circular track having a 120 meter radius and a surface comprising polished concrete. Water was supplied by a sprinkler system providing a surface water depth of between 1 and 3 mm.

Wet Handling. This test was performed by comparing the lap time required for a the same vehicle to travel completely around a wet auto-cross track having an asphalt surface. Water was supplied by a sprinkler system providing a surface water depth varying from damp conditions to standing water.

Longitudinal Hydroplaning. Each test was performed by determining the speed at which a 10% slip occurs on the driven wheels of the same vehicle instrumented with data acquisition equipment during hard acceleration on an asphalt surface having a controlled water depth of 8 mm.

Snow Traction. This test was performed by measuring the longitudinal traction of test tires mounted on a test vehicle travelling in a straight line path on snow or ice covered driving surface in accordance with ASTM F-1805 and General Motors GMW 15207 specifications.

Rolling Resistance. This test was performed by conducting an industry standard rolling resistance test on drum machine to determine the coefficient of rolling resistance (kg/ton).

Wear. This test was performed by determining the rate of tread loss for each tread to estimate the wear life (miles) and the wear rate (mm/10,000 miles) for each tire tread. In conducting the test, tires were fitted to identical vehicles and driven in a controlled manner over an established circuit on public highways. Tread loss was measured by measuring the tread depth.

With regard to FIGS. 15, 16, and 17, the tests specifically show an improvement in performance for each of the treads of the first, second, and third embodiments, respectively, over the reference tread in both new and worn tread stages. Specifically, there is a general improvement in wet performance in both new and worn stages, and, in an unworn stage, an improved performance in both rolling resistance and wear. Further, there is an increase in snow performance in the new and worn conditions while at least generally maintaining other performance criteria that would otherwise typically decrease when attempting to improve snow traction according to prior art methods.

While this invention has been described with reference to particular embodiments thereof, it shall be understood that such description is by way of illustration and not by way of limitation. For example, the tread features described herein may alter in size and quantity when employed on larger or smaller tires, or on tires having different architectures (i.e., constructions), different tread depths, or having been formed from molds having different profiles. Accordingly, the scope and content of the invention are to be defined only by the terms of the appended claims.

What is claimed is:

1. A multi-stage tire tread comprising:
    a thickness extending inward depthwise from an outer, ground-engaging side of the tread, the outer, ground-engaging side including an outer contact surface;
    two or more wear layers arranged within the tread thickness at different depths, the two or more wear layers comprising an outer wear layer and one or more inner wear layers arranged within the thickness of the tread below the outer wear layer; and,
    one or more outer grooves arranged within the outer wear layer, the one or more grooves exposed to the outer, ground-engaging side when the tread is in an unworn condition;
    the tread having a volumetric void ratio equal to approximately 0.25 to 0.40 in the unworn condition and approximately 0.25 to 0.40 in a worn condition where the outer, ground-engaging side is arranged along one of the inner wear layers in the worn condition and where the tread thickness is 1.6 mm in the worn condition, the tread further having a contact surface ratio equal to approximately 0.66 to 0.72 in the unworn condition and approximately 0.56 to 0.66 in the worn condition, where the contact surface ratio in the worn condition is less than the contact surface ratio in the unworn condition.

2. The tire tread of claim 1, where the volumetric void ratio of the tire tread is 0.30 to 0.35 in both the unworn condition and in the worn condition.

3. The tire tread of claim 2, the tire tread yet further having a longitudinal rigidity factor of tire tread is equal to approximately 0.39 to 0.55 in the unworn condition and approximately 1.43 to 1.75 in the worn condition.

4. The tire tread of claim 1, where the one or more grooves arranged in the outer wear layer increase in width as the grooves extend depthwise into the tread thickness.

5. The tire tread of claim 4, wherein the width of the one or more grooves arranged in the outer wear layer varies linearly as the grooves extend depthwise into the tread thickness.

6. The tire tread of claim 1, wherein the one or more outer grooves arranged in the outer wear layer include a plurality of outer grooves extending longitudinally along the length of the tread, where the plurality of outer grooves are spaced apart laterally to define a pair of opposing shoulder ribs and a plurality of intermediate ribs,
    the pair of opposing shoulder ribs being located at opposing lateral sides of the tread and the plurality of intermediate ribs being located between the pair of opposing shoulder ribs,
    where each of the plurality of outer grooves increase in width as each of the plurality of outer grooves extends depthwise into the tread thickness and into one or more of the inner wear layers, such that in the worn condition the width of each of the plurality of outer grooves along the outer, ground-engaging side is greater than the width of each of the plurality of outer grooves in the unworn condition,
    each of the pair of opposing shoulder ribs includes one or more sipes extending generally in a lateral direction of the tread, each of the one or more sipes extending into the tread thickness from the outer, ground-engaging side when the tread is in the unworn condition and to a submerged groove extending generally in the lateral direction of the tread and being arranged in one or more of the inner wear layers, the submerged groove being arranged along the outer, ground-engaging side in the worn condition,
    each of the intermediate ribs including a plurality of lateral sipes, each of the plurality of lateral sipes extending into the tread thickness from the outer, ground-engaging side in the unworn condition and being exposed along the outer, ground-engaging side in the worn condition, each of the plurality of lateral sipes undulates as each lateral sipe of the plurality of lateral sipes extends laterally.

7. The tire tread of claim 6, where each of the one or more sipes extending generally in a lateral direction of the tread in each of the pair of opposing shoulder ribs undulates as each of the one or more sipes extends into the tread thickness.

8. The tire tread of claim 6, where each of the intermediate ribs includes a plurality of lateral grooves, each of the plurality of lateral grooves extending into the tread thickness from the outer, ground-engaging side in the unworn condition and being exposed along the outer, ground-engaging side in the worn condition.

9. The tire tread of claim 6, where each of the one or more sipes extending generally in a lateral direction of the tread in each of the pair of opposing shoulder ribs undulates as each of the one or more sipes extends laterally.

10. The tire tread of claim 1, where the one or more outer grooves comprise a plurality of lateral grooves extending laterally and a plurality of longitudinal grooves extending longitudinally, the outer grooves defining a plurality of tread elements.

11. The tire tread of claim 10, wherein the said tread elements contain one or more sipes extending generally in a lateral direction, each of the one or more sipes extending in an undulating path radially and laterally and comprising one or more regions of reduced thickness.

12. The tire tread of claim 10, wherein the tread elements comprise a quantity of shoulder tread elements arranged on each of the opposing lateral sides of the tread and a quantity intermediate tread elements arranged laterally between the shoulder tread elements, where at least one of the quantity of longitudinal grooves is arranged between the each of the shoulder tread elements and the intermediate tread elements, the shoulder tread elements including one or more sipes extending generally in a lateral direction of the tire, the sipe including a radially undulating sipe portion extending into a thickness of the tire tread from the outer, ground-engaging side and comprising one or more regions of reduced thickness, the sipe portion terminating in an enlarged portion comprising a void forming a lateral groove exposed to the contact surface when the tire tread is worn to one of the inner wear layers.

13. The tire tread of claim 12, wherein one or more of the sipes contained in each of the intermediate tread elements comprises an upper sipe portion extending downward from the outer, ground-engaging side within the outer wear layer, a first lower sipe portion and a second lower sipe portion each extending downward from the upper sipe portion and generally forming an inverted "Y" cross-sectional shape.

14. The tire tread of claim 13, wherein one or more of the shoulder tread elements contain a first groove exposed when new and extending within the outer wear layer in a generally lateral direction across a portion of a width of the tread element and a second groove exposed to the outer, ground-engaging side when the tire tread is worn and extending within an inner wear layer generally in a lateral direction across the remaining portion of the width of the tread element, the second groove being in fluid communication with the first groove.

15. The tire tread of claim 14, wherein the said first and second grooves are co-linear.

16. The tire tread of claim 1, wherein the depth of the one or more outer grooves extending within the outer wear layer and one or more inner grooves extending within one of the inner wear layers is 6-10 millimeters.

17. The tire tread of claim 1, wherein the void volume ratios for the tread when new and when worn to one of the inner wear layers are approximately equal.

18. The tire tread of claim 1, where the contact surface ratio of the wear layer is approximately 90% of the contact surface ratio of the unworn tire tread.

19. The tire tread of claim 1, where the tire tread provides an at least 10% improvement in wet lateral adherence performance when the outer, ground-engaging side of the tread is arranged within one of the one or more inner wear layers when compared to the outer, ground-engaging side of the tread being arranged within the outer wear layer.

20. The tire tread of claim 1, where the contact surface ratio is equal to approximately 0.58 to 0.64 in the worn condition.

* * * * *